US009647879B2

(12) United States Patent
Shin et al.

(10) Patent No.: US 9,647,879 B2
(45) Date of Patent: May 9, 2017

(54) NETWORK BACKUP DEVICE AND NETWORK SYSTEM

(71) Applicant: Samsung SDS Co., Ltd., Seoul (KR)

(72) Inventors: Gun Il Shin, Suwon-si (KR); Jae Chul Kim, Suwon-si (KR); Seung Jae Lee, Suwon-si (KR); Ki Hyun Ahn, Seoul (KR); Si Hyung Lee, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 477 days.

(21) Appl. No.: 14/018,572

(22) Filed: Sep. 5, 2013

(65) Prior Publication Data

US 2014/0064059 A1    Mar. 6, 2014

(30) Foreign Application Priority Data

Sep. 5, 2012  (KR) .................. 10-2012-0098404
Oct. 10, 2012  (KR) .................. 10-2012-0112310

(51) Int. Cl.
H04L 12/24    (2006.01)

(52) U.S. Cl.
CPC ...... *H04L 41/0668* (2013.01); *H04L 41/0681* (2013.01)

(58) Field of Classification Search
USPC ....... 370/220, 221, 225, 227, 228, 241, 244, 370/248, 217; 714/1, 2, 3, 4.1, 4.2, 4.11,
(Continued)

(56) References Cited

U.S. PATENT DOCUMENTS

2006/0077888 A1* 4/2006 Karam .................. H04L 1/22
                                                         370/216
2007/0025240 A1*  2/2007 Snide ........................ 370/217
(Continued)

FOREIGN PATENT DOCUMENTS

CN      102067523 A       5/2011
EP        2458782 A1 *    5/2012
(Continued)

OTHER PUBLICATIONS

Communication dated May 20, 2016, from the State Intellectual Property Office of People's Republic of China in counterpart Application No. 201310400001.0.

*Primary Examiner* — Hanh N Nguyen
*Assistant Examiner* — Jose L Perez
(74) *Attorney, Agent, or Firm* — Sughrue Mion, PLLC

(57) ABSTRACT

Provided are a network backup device and a network system. The network backup device includes a first connector configured to connect with one or more ports of a first network equipment, a second connector configured to connect with one or more second network equipment, a third connector configured to connect with a third network equipment, a switching module configured to aggregate data transmitted from the second connector, transfer the aggregated data to the third connector, and distribute data transmitted from the third connector to the second connector, and a switch configured to, in response to a fault occurring in a port of the first network equipment, switch from a connection between the second connector and the faulty port of the first network equipment to a connection between the second connector and the switching module.

14 Claims, 5 Drawing Sheets

(58) Field of Classification Search
USPC .................. 714/4.12, 4.21; 709/235, 239
See application file for complete search history.

(56) References Cited

U.S. PATENT DOCUMENTS

| | | | |
|---|---|---|---|
| 2007/0165520 A1* | 7/2007 | Messing ................ | H04L 69/40 370/228 |
| 2009/0323517 A1* | 12/2009 | Elam et al. .................. | 370/218 |
| 2010/0142368 A1* | 6/2010 | Gunukula et al. ............ | 370/217 |
| 2010/0177644 A1* | 7/2010 | Kucharczyk .................. | 370/250 |
| 2011/0004779 A1* | 1/2011 | Karam ..................... | H04L 1/22 713/340 |

FOREIGN PATENT DOCUMENTS

| KR | WO 2011019144 A2 * | 2/2011 | ......... H04L 41/0668 |
|---|---|---|---|
| WO | 2010/065719 A2 | 6/2010 | |

* cited by examiner

NETWORK BACKUP DEVICE AND NETWORK SYSTEM

CROSS-REFERENCE TO RELATED APPLICATION

This application claims priority to and the benefit of Republic of Korea Patent Application Nos. 10-2012-0098404, filed on Sep. 5, 2012 and 10-2012-0112310, filed on Oct. 10, 2012, the disclosures of which are incorporated herein by reference in their entirety.

BACKGROUND

1. Field

The present disclosure relates to network technology, and more particularly, to a network backup device whereby backup network equipment can be simplified and a network system having the network backup device.

2. Discussion of Related Art

With the development of local area network (LAN) and Internet technology, most work is being done on computers recently in companies, public institutions, and so on. Thus, cases of building a network environment by connecting personal computers (PCs) with each other to enable data sharing and exchange between employees are increasing. Also, in industrial fields, production facilities are automated and controlled through a network in general.

FIG. 1 is a diagram showing a constitution of a general network system.

Referring to FIG. 1, a network system includes a server farm 10, a server farm switch 20, a distribution switch 30, terminal switches 40, and terminal devices 50.

Here, the server farm 10, the server switch 20, and the distribution switch 30 are dualized, and even when a fault occurs in a main device, it is possible to run a network using an auxiliary device without interruption. However, the number of terminal switches 40 is far more than the number of server farm switches 20 and the number of distribution switches 30, and dualization of the terminal switches 40 requires high cost. Also, due to non-standardized characteristics of the terminal devices 50, it is difficult to dualize the terminal devices 50. As a result, there is no choice but to implement a single network of the terminal devices 50. Since the terminal switches 40 are implemented as a single set, network communication is interrupted when a fault occurs in the terminal switches 40.

For this reason, Korean Patent Publication No. 10-0938738 (Jan. 26, 2010) described below discloses a network system in which a terminal switch is dualized to maintain communication without interruption even when a fault occurs in the terminal switch.

FIG. 2 is a diagram illustrating a backup method of a network system according to related art.

Referring to FIG. 2, a network system according to related art includes network switches 401, a backup network switch 405, terminal devices 500, and a network backup device 600.

Here, the terminal devices 500 are connected with the network switches 401 respectively through the network backup device 600. The network backup device 600 serves to switch any one of the five network switches 401 in which a fault has occurred to the backup network switch 405.

According to the related art, the network system is an n:1 backup network system in which the n network switches 401 are backed up by the one backup network switch 405. Thus, various configurations should be made in the backup network switch 405 according to cases in which the backup network switch 405 is used to back up the respective n network switches 401, and a constitution of the backup network switch 405 is complicated. Since the backup network switch 405 should replace a network switch in which a fault has occurred in a one-to-one fashion, the backup network switch 405 should have the same size and constitution as the network switches 401.

Since the network backup device 600 switches any one of the n network switches 401 in which a fault has occurred to the backup network switch 405, the network switches 401 should be prioritized to be switched to the backup network switch 405 when faults occur in several network switches. Also, priority orders of the network switches in which faults have occurred should be compared with each other, and thus a backup process of the network backup device 600 is complicated.

In addition, in the related art, the network backup device 600 should be manufactured to have the number of ports varying according to the number of the network switches 401 such that ports of the network backup device 600 are not wasted, resulting in an increase in production cost.

SUMMARY

Embodiments of the present disclosure are directed to providing a network backup device whereby backup network equipment and a backup process can be simplified, and a network system having the network backup device.

According to an aspect of the present disclosure, there is provided a network backup device including a first connector configured to connect with one or more ports of a first network equipment, a second connector configured to connect with one or more second network equipment, a third connector configured to connect with a third network equipment, a switching module configured to aggregate data transmitted from the second connector, transfer the aggregated data to the third connector, and distribute data transmitted from the third connector to the second connector, and a switch configured to, in response to a fault occurring in a port of the first network equipment, switch from a connection between the second connector and the faulty port of the first network equipment to a connection between the second connector and the switching module.

The network backup device may further include a signal sensor configured to detect a fault signal from the first connector, wherein the switch is controlled based on whether the fault has occurred in the port of the first network equipment as indicated by a detection result of the signal sensor.

The fault signal may include at least one from among a link signal, a link pulse signal, a message in an Internet control message protocol (ICMP) form, and a cyclic redundancy check (CRC) error message output from the first connector.

The network backup device may further include a bypass switch configured to, in response to the network backup device entering a non-operational state, directly connect the first connector with the second connector. The network backup device may enter the non-operation state, in response to at least one from among a temperature exceeding a predetermined threshold, a fan related malfunction, and a communication line malfunction occurring in the network backup device.

The switching module may connect with a single port of the third network equipment.

According to another aspect of the present disclosure, there is provided a network system including a network equipment including one or more ports, a backup network equipment configured to replace the network equipment in response to a fault occurring in the network equipment, and a network backup device configured to connect each of one or more terminal devices to the one or more respective ports of the network equipment, and in response to a fault occurring in a port of the network equipment, to switch a connection of a terminal device from the faulty port to the backup network equipment, wherein the network backup device includes a switching module configured to aggregate data transmitted from the switched terminal device, transfer the aggregated data to the backup network equipment, and distribute data transmitted from the backup network equipment to the switched terminal device.

The network backup device may further include a switch configured to switch from a connection between the terminal device and the faulty port of the network equipment to a connection between the terminal device and the switching module.

The network backup device may further include a first connector connected with the one or more respective ports of network equipment, a second connector connected with the respective terminal devices, and a bypass switch configured to directly connect the first connector with the second connector in response to a malfunction occurring in the network backup device.

The malfunction may occur in the network backup device when at least one from among a temperature exceeding a predetermined threshold, a fan related malfunction, and a communication line malfunction occurs in the network backup device.

The network backup device may further include a signal sensor configured to detect a fault signal from the first connector, and to determine whether a fault has occurred in a port of the network equipment according a detection result of the signal sensor.

The fault signal may include at least one from among a link signal, a link pulse signal, a message in an Internet control message protocol (ICMP) form, and a cyclic redundancy check (CRC) error message output from the first connector.

The backup network equipment may include a single port that is connected to the switching module of the network backup device.

According to still another aspect of the present disclosure, there is provided a network backup device including a first connector configured to connect with a network switch, a second connector configured to connect with a terminal, a third connector configured to connect with a backup network switch, a switching module, a switch configured to form a first connection that transfers data between the first connector and the second connector, and in response to a fault occurring in a port of the network switch, to form a second connection that transfers data between the second connector and the switching module, wherein the switching module configured to transfer data between the second connector and the third connector.

The switching module may be connected to a single port of the backup network switch.

The first connector may be configured to connect with a plurality of ports of the network switch, and the second connector configured to connect with a plurality of terminals, and in response to more than one port of the network switch becoming faulty, the switching module may transfer data between ports of the second connector that correspond to the faulty ports of the network switch and the single port of the backup network switch.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of a network backup device, a network system having the network backup device, and an operation method of the network system in accordance with the present disclosure will be described with reference to FIG. 3 to FIG. 5. However, the embodiments are merely examples and are not to be construed as limiting the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
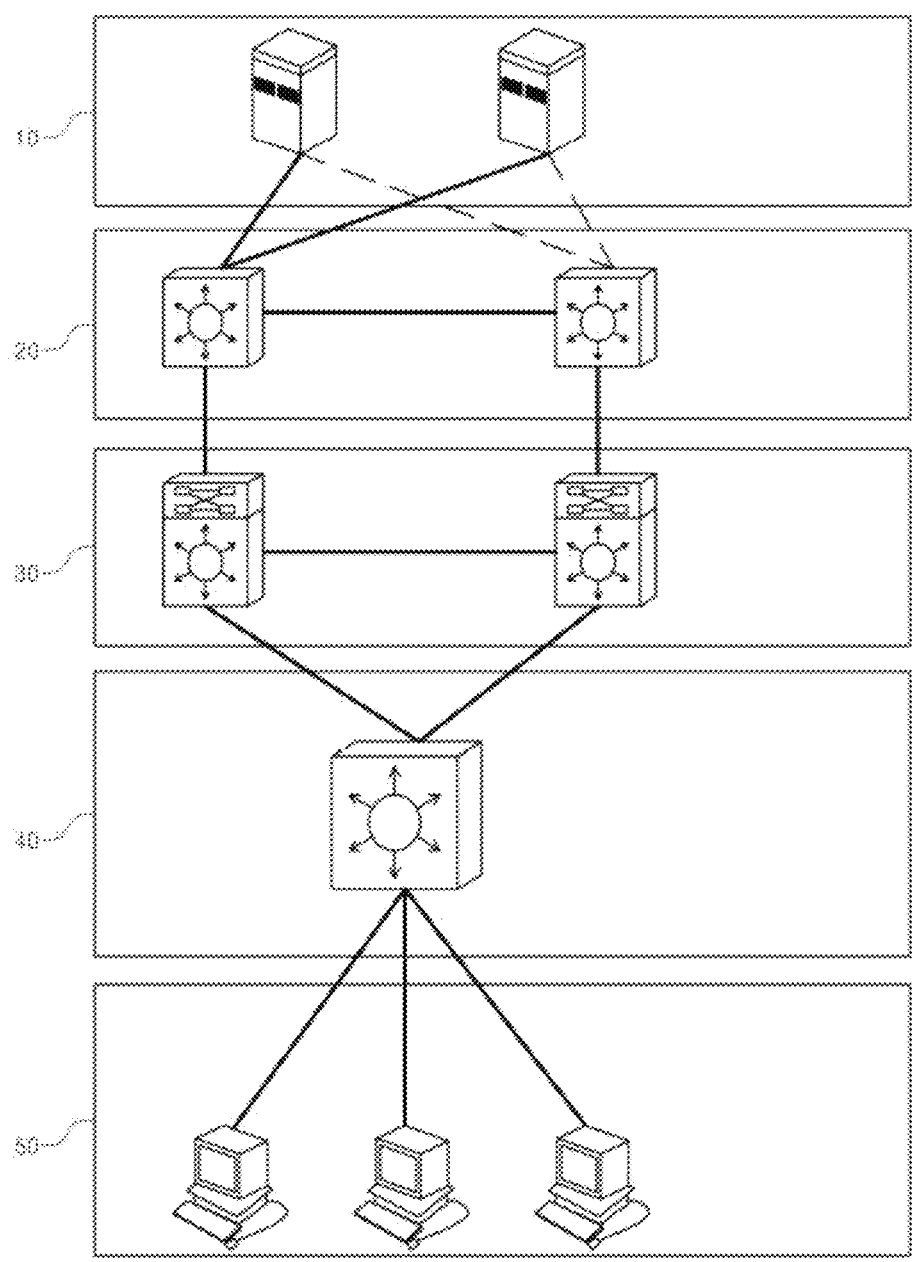
FIG. 1 is a diagram showing a constitution of a general network system.
Figure 2:
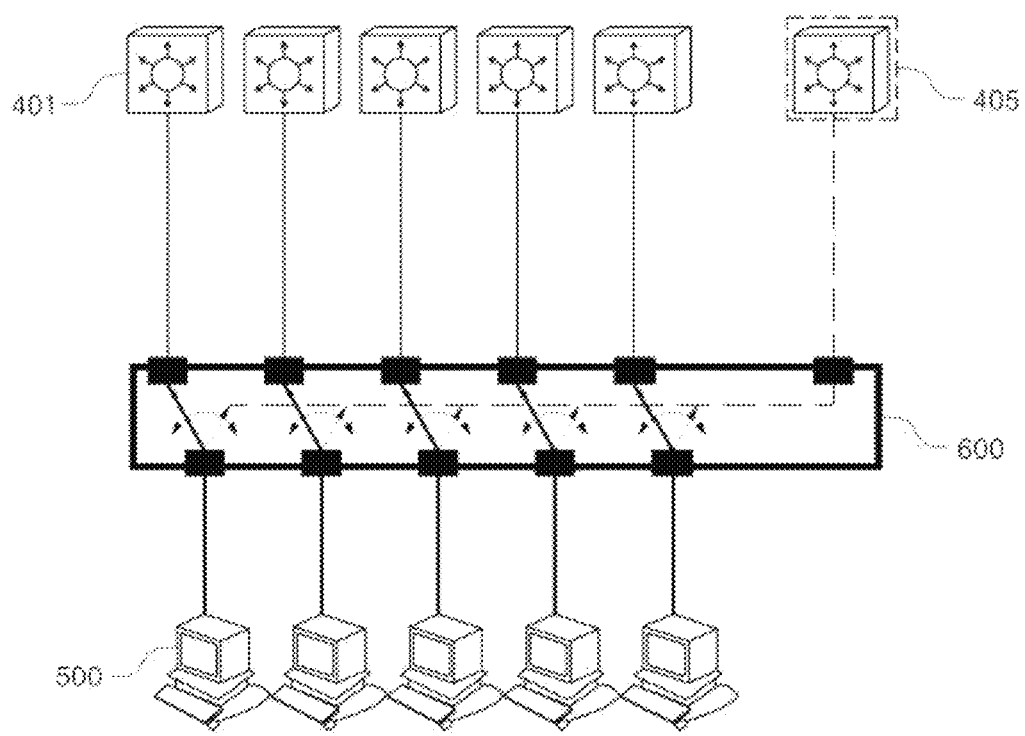
FIG. 2 is a diagram illustrating a backup method of a network system according to related art.
Figure 3:
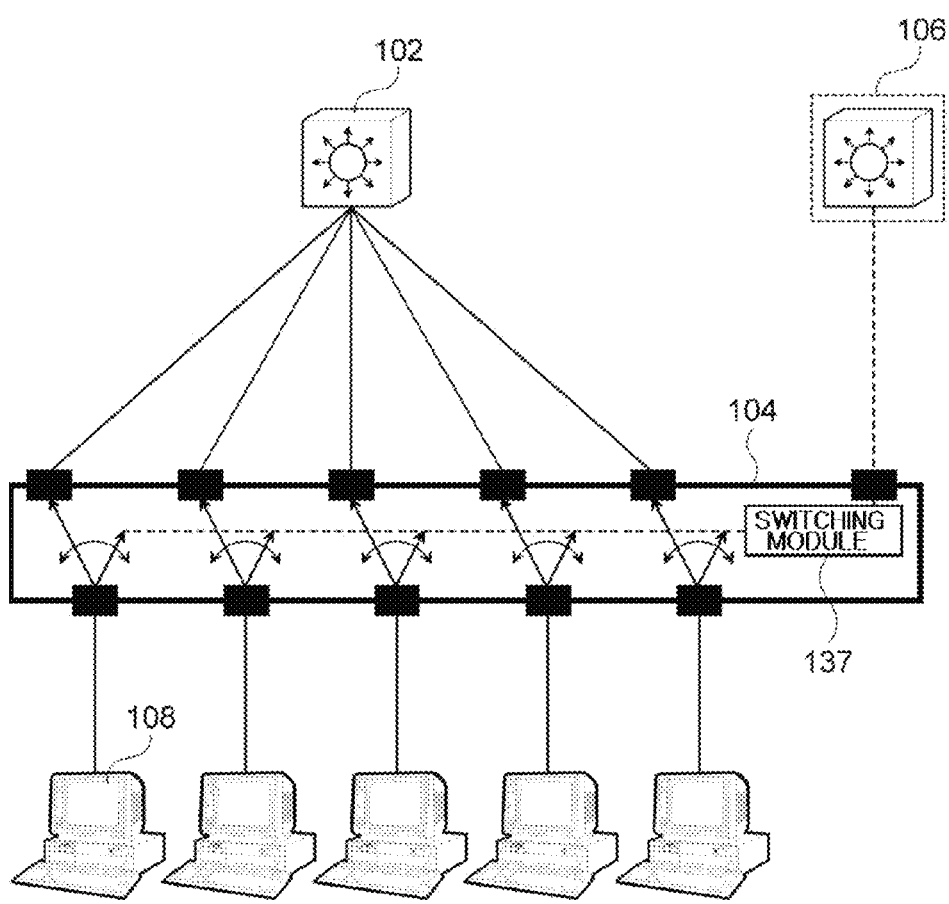
FIG. 3 is a diagram of a network system according to an exemplary embodiment of the present disclosure.

FIG. 3 is a diagram of a network system according to an exemplary embodiment of the present disclosure.

Referring to FIG. 3, a network system 100 includes a network switch 102, a network backup device 104, a backup network switch 106, and terminal devices 108. Although a network switch and a backup network switch are described as an embodiment of network equipment included in the network system 100 herein, the present disclosure is not limited to them, and various other pieces of network equipment can be applied. Meanwhile, in exemplary embodiments of the present disclosure, the term "backup" may include a "dualization" of performing a function of a network switch in replacement of the network switch 102 when a fault occurs in the network switch 102. However, the present disclosure is not necessarily limited to this, and in the present disclosure, it is noted that backup may further include triplization, quadruplication, or more in which one or more backup switches replace a network switch when a fault occurs in the network switch.

The network switch 102 serves to aggregate data (or signals) transmitted from the respective terminal devices 108 and transfer the aggregated data to other network equipment (e.g., a distribution switch or a server farm switch). Also, the network switch 102 serves to distribute and transfer data (or a signal) transmitted from other network equipment to the respective terminal devices 108.

The network switch 102 has one or more ports, and the respective ports may be connected with the respective terminal devices 108 through the network backup device 104 in a one-to-one fashion. In other words, in an exemplary embodiment of the present disclosure, the one network switch 102 is connected with the one or more terminal devices 108 through the network backup device 104.

The network backup device 104 connects the respective ports of the network switch 102 with the respective terminal devices 108. The network backup device 104 serves to monitor operation states of the respective ports of the network switch 102 and switch a port in which a fault has occurred to the backup network switch 106. The fault may include communication errors as well physical (or mechanical) faults. Meanwhile, in exemplary embodiments of the present disclosure, the term "switch" denotes an operation of changing a connection with a specific device to a connection with another device. For example, when device A is connected with a network through device B, if the connection is released, and a connection between device A and the network is established again through device C, it is said that "a connection with device B is switched to device C."

The network backup device 104 connects the respective ports of the network switch 102 with the respective terminal devices 103 in the normal state, but when a fault occurs in a port of the network switch 102, the network backup device 104 cuts off a connection between the port in which fault has occurred and a terminal device 108 corresponding to the port in which fault has occurred, and connects the corresponding terminal device 108 with the backup network switch 106.

The network backup device 104 includes a switching module 137. When a fault occurs in a port of the network switch 102, the network backup device 104 switches a terminal device 108 corresponding to the port in which fault has occurred to the switching module 137, thereby connecting the corresponding terminal device 108 with the backup network switch 106.

In this case, even when faults occur in more than one ports of the network switch 102, the network backup device 104 is capable of connecting all terminal devices 108 corresponding to the ports in which the faults have occurred to the backup network switch 106 through the switching module 137.

In other words, when faults occur in several ports of the network switch 102, the network backup device 104 switches terminal devices 108 corresponding to the ports in which the faults have occurred to the switching module 137. Since the switching module 137 aggregates data transmitted from the corresponding terminal devices 108, transfers the aggregated data to the backup network switch 106, and distributes and transfers data transferred from the backup network switch 106 to the corresponding terminal devices 108, all the corresponding terminal devices 108 can be connected to the backup network switch 106.

The backup network switch 106 serves to back up the network switch 102. At this time, since one port of the backup network switch 106 corresponds to the one network switch 102 in the one-to-one fashion, a configuration for only the corresponding network switch is required, and thus it is possible to simplify a constitution of the backup network switch 106.

Specifically, the backup network switch 106 is connected with a terminal device 108 corresponding to a port of the network switch 102 in which a fault has occurred through the network backup device 104. In other words, the backup network switch 106 serves to replace a port of the network switch 102 in which a fault has occurred.

Here, the backup network switch 106 is connected with the switching module 137 in the network backup device 104. Since the backup network switch 106 needs no more than one port connected with the switching module 137, the size of the backup network switch 106 can be remarkably reduced compared with the network switch 102.

In other words, since the switching module 137 in the network backup device 104 aggregates data transmitted from terminal devices 108 corresponding to ports in which faults have occurred and distributes data transmitted from the backup network switch 106, the backup network switch 106 should have only one port connected with the switching module 137, and can serve to back up the network switch 102 having several ports using only the one port.

Meanwhile, the network system 100 may further include a monitoring unit (not shown) that monitors whether or not there is trouble in the corresponding network. For example, the monitoring unit (not shown) may monitor whether or not a fault has occurred in a port of the network switch 102, whether or not there is trouble in the network backup device 104, and so on, and when a fault or trouble occurs in the network switch 102 or the network backup device 104, the monitoring unit may notify an administrator of the corresponding event. The monitoring unit (not shown) may be implemented using a simple network management protocol (SNMP), but is not limited to this.

Figure 4:
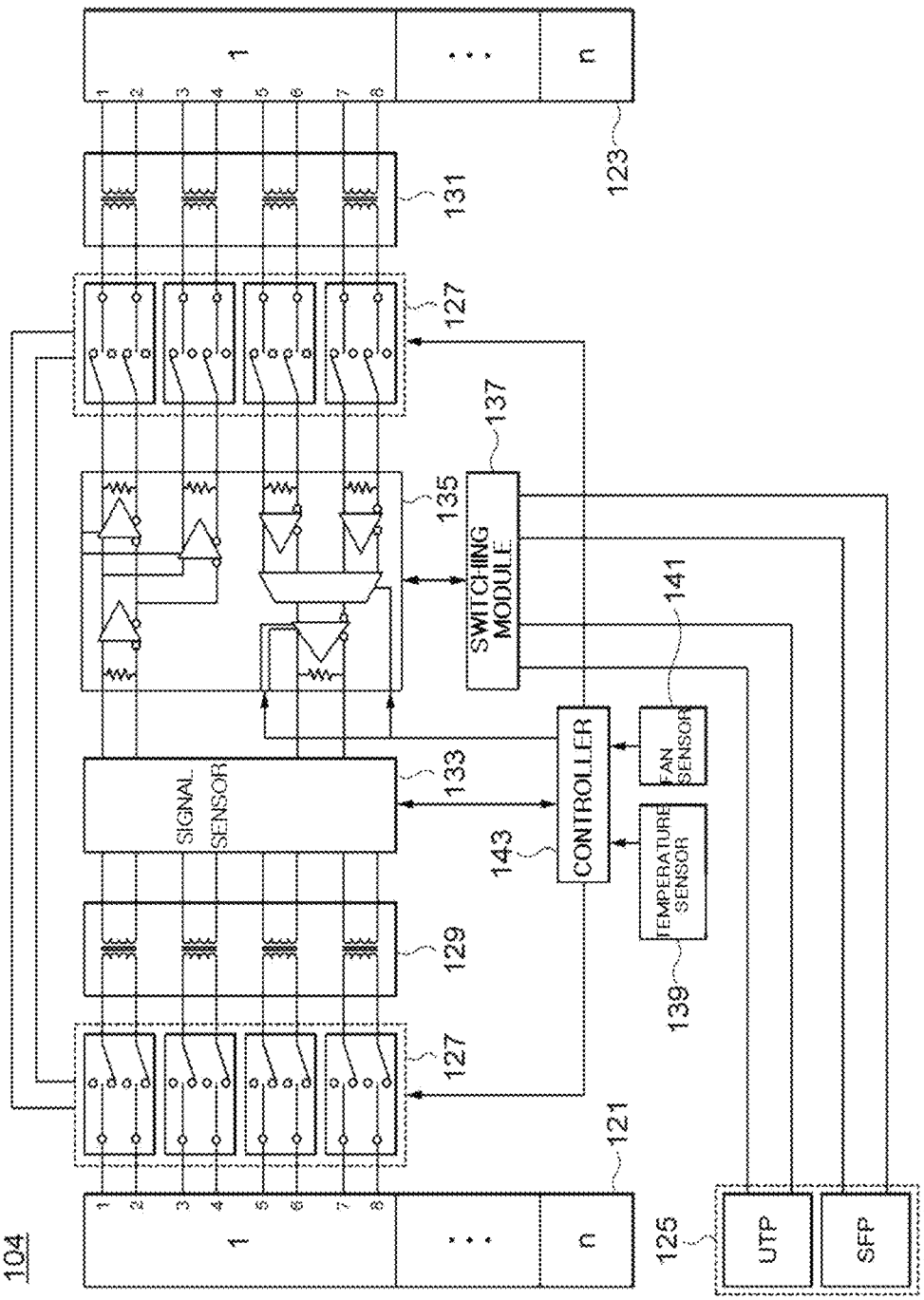
FIG. 4 is a diagram showing a constitution of a network backup device according to an exemplary embodiment of the present disclosure.

FIG. 4 is a diagram showing a constitution of a network backup device according to an exemplary embodiment of the present disclosure.

Referring to FIG. 4, a network backup device 104 includes a first connector 121, a second connector 123, a third connector 125, a bypass switch 127, a first signal amplifier 129, a second signal amplifier 131, a signal sensor 133, a switch 135, a switching module 137, a temperature sensor 139, a fan sensor 141, and a controller 143.

The first connector 121 is connected to a network switch 102. The first connector 121 has n ports connected with respective ports of the network switch 102.

The second connector 123 is connected to terminal devices 108. The first connector 121 has n ports connected with the respective terminal devices 108.

The third connector 125 is connected to a backup network switch 106. The third connector 125 has one or more ports connected to the backup network switch 106. Here, the third connector 125 may include, for example, an unshielded twisted pair (UTP) connector port and a small form factor pluggable (SFP) connector port.

The bypass switch 127 serves to directly connect the first connector 121 and the second connector 123 under the control of the controller 143 when the network backup device 104 is in non-operational state. When the network backup device 104 is not operational while the network switch 102 and the terminal devices 108 are connected through the network backup device 104, it is impossible to perform communication between the network switch 102 and the terminal devices 108. Thus, when a failure or trouble occurs in the network backup device 104, the network switch 102 and the terminal devices 108 are directly connected through the bypass switch 127, such that communication between the network switch 102 and the terminal devices 108 is maintained.

The first signal amplifier 129 serves to amplify a signal transmitted from the second connector 123 to the first connector 121. However, operation of the first signal amplifier 129 is not limited to this, and a signal transmitted from the first connector 121 to the second connector 123 may be amplified.

The second signal amplifier 131 serves to amplify a signal transmitted from the first connector 121 to the second connector 123. However, operation of the second signal amplifier 131 is not limited to this, and a signal transmitted from the second connector 123 to the first connector 121 may be amplified.

The signal sensor 133 detects or senses a fault of the first connector 121. By detecting a fault signal output from the first connector 121, the signal sensor 133 may detect a fault of the first connector 121. For example, the signal sensor 133 may detect a link signal or a link pulse signal output from the first connector 121. According to a detection result of the signal sensor, that is, whether or not the signal sensor 133 has detected a link signal or a link pulse signal, the controller 143 may determine whether or not a fault has occurred in the corresponding port of the network switch 102. The fault signal may be received from the first connector 121 in an Internet control message protocol (ICMP) form. In other words, the signal sensor 133 detects a fault signal transmitted from the first connector 121 using the ICMP, and thereby may determine whether or not a fault has occurred in the corresponding port of the network switch 102.

In addition, the signal sensor 133 may use cyclic redundancy check (CRC) to detect a fault of the network switch 102. A CRC error detection bit is included in a packet transmitted on a network, and when transmission of the packet is not properly performed due to a hardware problem or other physical problems, a CRC error occurs. Then, the signal sensor 133 detects a fault from the CRC error received from the first connector 121, and thereby may detect a fault of the network switch 102 or a line connected with the network switch 102.

The switch 135 usually connects a port of the first connector 121 and a port of the second connector 123 corresponding to the port of the first connector 121. Also, under the control of the controller 143, the switch 135 serves to switch a port of the second connector 123 corresponding to a port of the network switch 102 in which a fault has occurred to the switching module 137. Specifically, the switch 135 cuts off a connection between a port of the first connector 121 connected to the port of the network switch 102 in which the fault has occurred and the port of the second connector 123 corresponding to the port of the network switch 102, and connects the port of the second connector 123 to the switching module 137. In other words, the respective ports of the second connector 123 are usually connected with the corresponding ports of the first connector 121 through the switch 134, but when a fault occurs in a port of the network switch 102, a port of the second connector 123 corresponding to the port in which the fault has occurred is connected with the switching module 137 by the switch 135.

The switching module 137 connects a port of the second connector 123 corresponding to a port of the network switch 102 in which a fault has occurred to the third connector 125. At this time, the third connector 125 is connected with the backup network switch 106, and thus a terminal device 108 connected with the port of the network switch 102 in which the fault has occurred is switched to the backup network switch 106.

Here, the switching module 137 has a switching hub function, and thus even when faults occur in several ports of the network switch 102, it is possible to connect all terminal devices 103 corresponding to the ports in which the faults have occurred to the backup network switch 106.

Meanwhile, the switching module 137 may be independently implemented from communication lines in the network backup device 104. In this case, even when trouble occurs in the switching module 137, a network communication service is not affected in the normal state.

The temperature sensor 139 detects a temperature in the network backup device 104. When the temperature in the network backup device 104 exceeds a predetermined temperature range, the temperature sensor 139 generates a temperature trouble signal to the controller 143.

The fan sensor 141 detects whether or not there is trouble in a fan installed in the network backup device 104. When trouble of the fan is detected, the fan sensor 141 generates a fan trouble signal to the controller 143.

When trouble occurs in the network backup device 104, the controller 143 controls the bypass switch 127 to directly connect the first connector 121 and the second connector 123. For example, when the temperature sensor 139 generates a temperature trouble signal, or the fan sensor 141 generates a fan trouble signal, the controller 143 may control the bypass switch 127 to directly connect the first connector 121 and the second connector 123. Although it has been described herein that the temperature sensor 139 and the fan sensor 141 are used to detect whether or not there is trouble in the network backup device 104, sensors are not limited to these, and various sensors other than these may be used to detect whether or not there is trouble in the network backup device 104 (e.g., trouble of a communication line).

The controller 143 monitors whether or not a fault has occurred in the respective ports of the network switch 102 through the signal sensor 133. The signal sensor 133 detects a fault signal from the first connector 121 connected with the respective ports of the network switch 102.

For example, according to whether or not the signal sensor 133 has detected a link signal, the controller 143 may find a link state of the corresponding port of the network switch 102. In other words, when the signal sensor 133 detects a link signal, the corresponding port of the network switch 102 is in a link-up state, and when the signal sensor 133 detects no link signal, the corresponding port of the network switch 102 is in a link-down state. Here, the link-up state denotes a case in which data traffic is generated between a port of the network switch 102 and a port of the first connector 121 corresponding to the port of the network switch 102, and the link-down state denotes a case in which no data traffic is generated between a port of the network switch 102 and a port of the first connector 121 corresponding to the port of the network switch 102.

In other words, when the signal sensor 133 detects a link signal for a port of the network switch 102, the controller 143 determines that the corresponding port of the network switch 102 is in the normal state, and may determine whether or not a fault has occurred in the next port.

On the other hand, a case in which the signal sensor 133 detects no link signal at a port of the first connector 121 corresponding to the port of the network switch 102 may be a case in which a fault has occurred in the corresponding port of the network switch 102, or the corresponding port of the network switch 102 and the port of the first connector 121 corresponding to the port of the network switch 102 are not physically connected.

Thus, when no link signal is detected at a port of the first connector 121 corresponding to a port of the network switch 102, the signal sensor 133 detects a link pulse signal output from the port of the first connector 121 to correctly determine whether or not a fault has occurred in the corresponding port. Here, when the signal sensor 133 detects no link pulse signal, the controller 143 determines that a fault has occurred in the corresponding port of the network switch 102. On the other hand, when the signal sensor 133 detects a link pulse signal, the controller 143 determines that the corresponding port of the network switch 102 is in the normal state, and may determine whether or not a fault has occurred in the next port.

The aforementioned link signal and link pulse signal are merely examples, and a fault signal detected by the signal sensor 133 is not limited to these. In other words, the fault signal includes all signals from which it is possible to detect a fault in the corresponding port, such as a message in the ICMP form and a CRC error in addition to the link signal and the link pulse signal.

When it is determined that a fault has occurred in a port of the network switch 102, the controller 143 controls the switch 135 to switch a port of the second connector 123 corresponding to the port of the network switch 102 in which the fault has occurred to the switching module 137.

Also, when the port of the network switch 102 in which the fault has occurred is recovered to the normal state, the controller 143 may control the switch 135 to switch the port of the second connector 123 that has been switched to the switching module 137 to the port of the network switch 102 recovered from the fault.

The network backup device 104 may further include a Power over Ethernet (PoE) power supply (not shown). In this case, it is possible to supply power through a cable without another power supply, and stably perform data communication. Also, when the network backup device 104 has a PoE power supply (not shown), the corresponding network system can be readily applied to voice over Internet protocol (VoIP) telephones, and so on.

In the 1:1 backup network system according to an exemplary embodiment of the present disclosure, the one network switch 102 is backed up by the one backup network switch 106. For this reason, the backup network switch 106 requires a configuration for only the corresponding network switch 102, and it is possible to simplify a constitution of the backup network switch 106. The backup network switch 106 can serve to back up one or more ports of the network switch 102, and thus it is possible to perform port-based n:1 backup.

In addition, since the backup network switch 106 needs no more than one port connected with the switching module 137, the size of the backup network switch 106 can be remarkably reduced compared with the network switch 102. In other words, the backup network switch 106 can be remarkably reduced in size despite its function of backing up the network switch 102.

Further, the network backup device 104 includes the switching module 137 having the switching hub function therein. Thus, even when faults occur in several ports of the network switch 102, it is unnecessary to set priority orders to process the ports, and all terminal devices 108 corresponding to the ports in which the faults have occurred can be connected to the backup network switch 106.

Moreover, due to the bypass switch 127 and the switching module 137 independently implemented from the communication lines in the network backup device 104, even when trouble occurs in the network backup device 104 and the switching module 137, it is possible to maintain normal communication between the network switch 102 and the terminal devices 108.

Figure 5:
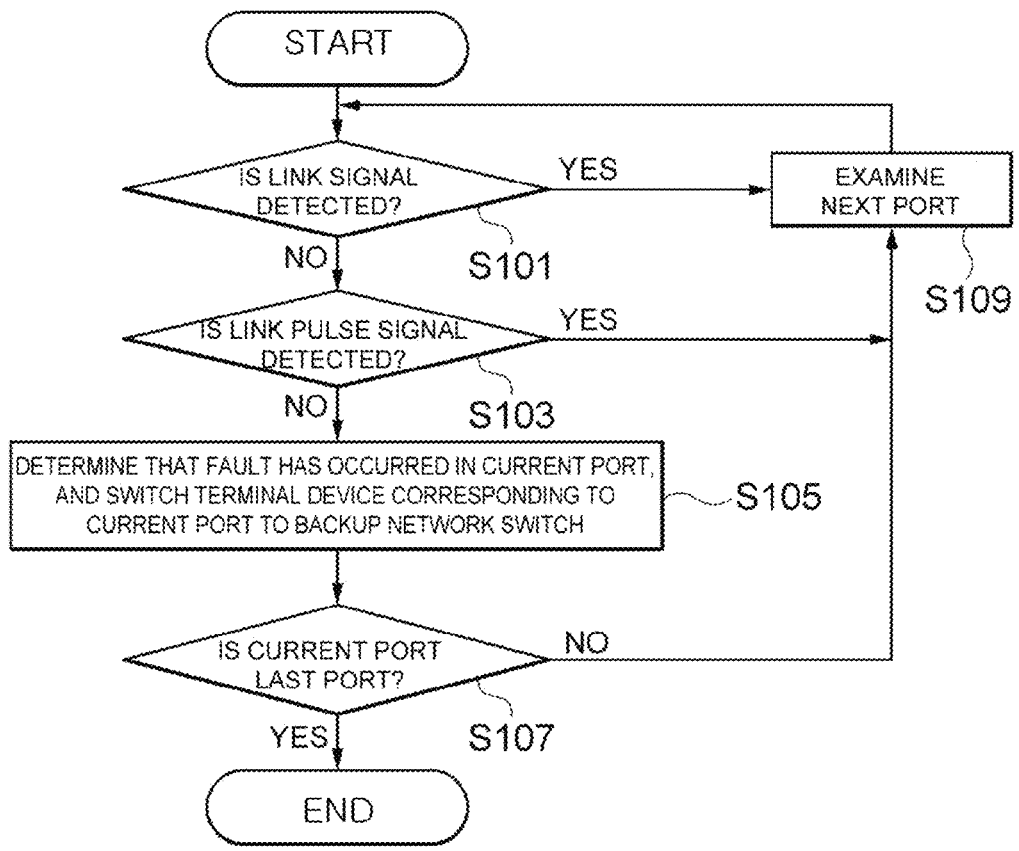
FIG. 5 is a flowchart illustrating an operation method of a network system according to an exemplary embodiment of the present disclosure.

FIG. 5 is a flowchart illustrating an operation method of a network system according to an exemplary embodiment of the present disclosure.

Referring to FIG. 5, a network backup device 104 checks whether or not a link signal is detected at a port of a network switch 102 that is currently under examination (S101).

When it is checked in step S101 that no link signal is detected at the port of the network switch 102 that is currently under examination, the network backup device 104 checks whether or not a link pulse signal is detected at the port of the network switch 102 that is currently under examination (S103).

When it is checked in step S103 that no link pulse signal is detected at the port of the network switch 102 that is currently under examination, the network backup device 104 determines that a fault has occurred in the port of the network switch 102 that is currently under examination, and switches a terminal device 108 corresponding to the port of the network switch 102 that is currently under examination to a backup network switch 106 (S105).

Specifically, when a fault has occurred in the port of the network switch 102 that is currently under examination, the network backup device 104 cuts off a connection between the port of the network switch 102 in which the fault has occurred and the terminal device 108 corresponding to the port of the network switch 102, and connects the terminal device 108 with the backup network switch 106 through the switching module 137.

Next, the network backup device 104 checks whether or not the port of the network switch 102 that is currently under examination is the last port (S107), and examines whether a fault has occurred in the next port of the network switch 102 when the port currently under examination is not the last port (S109).

Meanwhile, when it is checked in step S101 that a link signal is detected at the port of the network switch 102 that is currently under examination, the network backup device 104 determines that the port of the network switch 102 that is currently under examination is in the normal state, and examines whether a fault has occurred in the next port of the network switch 102 (S109).

In addition, when it is checked in step S103 that a link pulse signal is detected at the port of the network switch 102 that is currently under examination, the network backup device 104 determines that the port of the network switch 102 that is currently under examination is in the normal state, and examines whether a fault has occurred in the next port of the network switch 102 (S109).

In an exemplary embodiment of the present disclosure, one network switch is backed up by one backup network switch. For this reason, a backup network switch requires a configuration for only the corresponding network switch, and it is possible to simplify a constitution of the backup network switch. Here, the backup network switch can serve to back up one or more ports of the network switch, and thus it is possible to perform port-based n:1 backup.

In addition, since a backup network switch needs no more than one port connected with a switching module in a network backup device, the size of the backup network switch can be remarkably reduced compared with a network switch. In other words, a backup network switch can be remarkably reduced in size despite its function of backing up a network switch.

Further, a network backup device includes a switching module having a switching hub function therein. Thus, even when faults occur in several ports of a network switch, it is unnecessary to set priority orders to process the ports, and all terminal devices corresponding to the ports in which the faults have occurred can be connected to a backup network switch.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A network backup device comprising:
a first plurality of ports, each port in the first plurality of ports being configured to connect with a corresponding port of a first network equipment;
a second plurality of ports, each port in the second plurality of ports being configured to connect with a corresponding one of a plurality of second network equipment;
a third port configured to connect with a third network equipment;
a switching hub; and
a plurality of switches, each switch in the plurality of switches being configured to control connection of a second port of the ports in the second plurality of ports to a first port of the ports in the first plurality of ports or the switching hub,
wherein each switch in the plurality of switches is configured to connect the second port to the first port in response to the first port not being faulty,
wherein each switch in the plurality of switches is configured to connect the second port to the switching hub, in response to the first port being faulty, and
wherein the switching hub receives data from the one or more ports in the second plurality of ports when connected via one or more corresponding switches in the plurality of switches, transfers the received data to the third port, and distributes data received from the third network equipment received at the third port to the one or more ports in the second plurality of ports when connected via the one or more corresponding switches in the plurality of switches.

2. The network backup device of claim 1, further comprising a signal sensor configured to detect a fault signal from one or more ports in the first plurality of ports,
each switch in the plurality of switches corresponding to the one or more ports in the first plurality of ports in which a fault signal is detected is controlled to switch between its corresponding first port and the switching hub based on a detection result of the signal sensor.

3. The network backup device of claim 2, wherein the fault signal includes at least one from among a link signal, a link pulse signal, a message in an Internet control message protocol (ICMP) form, and a cyclic redundancy check (CRC) error message output from the one or more ports in the first plurality of ports.

4. The network backup device of claim 1, further comprising a bypass switch configured to, in response to the network backup device entering a non-operational state, directly connect the ports in the first plurality of ports with the ports in the second plurality of ports.

5. The network backup device of claim 4, wherein the network backup device enters the non-operation state, in response to at least one from among a temperature exceeding a predetermined threshold, a fan related malfunction, and a communication line malfunction occurring in the network backup device.

6. The network backup device of claim 1, wherein the switching hub connects with a single port of the third network equipment, the single port being the third port.

7. A network system, comprising:
a network equipment including first ports;
a backup network equipment configured to operate in place of the network equipment in response to a fault occurring in the network equipment; and
a network backup device configured to connect each of a plurality of terminal devices to a respective first port of the network equipment, and in response to the fault occurring in one or more of the first ports of the network equipment, to switch a connection of each terminal device among the terminal devices from the one or more faulty first ports to the backup network equipment,
wherein the network backup device includes a switching configured to receive data transmitted from each of the switched terminal devices, transfer the received data to the backup network equipment, and distribute data transmitted from the backup network equipment to each of the switched terminal devices.

8. The network system of claim 7, wherein the network backup device further includes a plurality of switches each being configured to switch from a connection between one of the terminal devices and one of the faulty first ports of the network equipment to a connection between one of the terminal devices and the switching hub.

9. The network system of claim 7, wherein the network backup device further includes:
a first plurality of ports, each port in the first plurality of ports being connected to a respective one of the first ports of the network equipment;
a second plurality of ports, each port in the second plurality of ports being connected with a respective one of the terminal devices; and
a bypass switch configured to directly connect the ports in the first plurality of ports with the ports in the second plurality of ports in response to a malfunction occurring in the backup network equipment.

10. The network system of claim 9, wherein the malfunction occurs in the network backup device when at least one from among a temperature exceeding a predetermined threshold, a fan related malfunction, and a communication line malfunction occurs in the network backup device.

11. The network system of claim 9, wherein the network backup device further includes a signal sensor configured to detect a fault signal from one or more ports from the first plurality of ports, and determine whether a fault has occurred in one of the first ports of the network equipment according a detection result of the signal sensor.

12. The network system of claim 11, wherein the fault signal includes at least one from among a link signal, a link pulse signal, a message in an Internet control message protocol (ICMP) form, and a cyclic redundancy check (CRC) error message output from the one or more ports from the first plurality of ports.

13. The network system of claim 7, wherein the backup network equipment includes a single port that is connected to the switching hub of the network backup device.

14. A network backup device comprising:
a first set of device ports configured to connect with a plurality of ports of a network switch;

a second set of device ports configured to connect with a plurality of terminals;

a third port configured to connect with a backup network switch;

a switching hub configured to be connected to a single port of the backup network switch; and a switch configured to form a first connection that transfers data between the first set of device ports and the second set of device ports, and in response to a fault occurring in a port of the network switch, to form a second connection that transfers data between the second set of device ports and the switching hub, wherein the switching hub is configured to transfer data between the second set of device ports and the third port, and in response to more than one port of the network switch becoming faulty, the switching hub transfers data between ports of the second set of device ports that correspond to the faulty ports of the network switch and the single port of the backup network switch.

* * * * *